US011333844B2

(12) United States Patent
Ma

(10) Patent No.: US 11,333,844 B2
(45) Date of Patent: May 17, 2022

(54) LENS MODULE

(71) Applicant: AAC Optics Solutions Pte. Ltd., Singapore (SG)

(72) Inventor: Jie Ma, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 309 days.

(21) Appl. No.: 16/686,227

(22) Filed: Nov. 18, 2019

(65) Prior Publication Data

US 2020/0158983 A1 May 21, 2020

(30) Foreign Application Priority Data

Nov. 19, 2018 (CN) ........................ 201821907327.7

(51) Int. Cl.
*G02B 7/02* (2021.01)
*H04N 5/225* (2006.01)

(52) U.S. Cl.
CPC ............. *G02B 7/021* (2013.01); *G02B 7/026* (2013.01); *H04N 5/2254* (2013.01)

(58) Field of Classification Search
CPC .......... G02B 7/02; G02B 7/021; G02B 7/022; G02B 7/023; G02B 7/025; G02B 7/026; G02B 13/0045; G02B 13/0015; G02B 7/003; G02B 7/102; G02B 7/04; G02B 7/00; G02B 7/08; G02B 7/10; G02B 7/028; H04N 5/0054; H04N 5/2254; G03B 17/14
See application file for complete search history.

(56) References Cited

U.S. PATENT DOCUMENTS

2013/0258503 A1* 10/2013 Lu ........................ B23K 26/242 359/819
2015/0301303 A1* 10/2015 Kim ...................... B32B 37/142 348/373
2020/0103611 A1* 4/2020 Yang ...................... G02B 7/003
2020/0158988 A1* 5/2020 Feng ...................... G02B 7/026

FOREIGN PATENT DOCUMENTS

CN 102914844 A * 2/2013

* cited by examiner

*Primary Examiner* — Ephrem Z Mebrahtu
(74) *Attorney, Agent, or Firm* — W&G Law Group

(57) ABSTRACT

The present disclosure discloses a lens module. The lens module includes a lens barrel, a lens having an optical axis accommodated in the lens barrel, and a pressing ring abutted against the lens from an image side. The pressing ring includes an upper surface close to an object side, a lower surface disposed opposite to the upper surface, an inner connecting surface connecting the upper surface and the lower surface, and an outer connecting surface opposite to the inner connecting surface. The outer connecting surface is abutted against the lens barrel. The lens module provided by the present disclosure can ensure the assembly precision of the pressing ring and improve the yield rate of the lens module.

7 Claims, 2 Drawing Sheets

100 O 16 11 14 15 121 12 123 122 131 134 133 13 132 A O'

A 1222 1222a 1222b 1222c 11 1331 133 1332 134 1311 1312 1313 131 1314 132

LENS MODULE

TECHNICAL FIELD

The embodiments of the present disclosure relate to the field of optical imaging technologies, and more particularly to a lens module.

BACKGROUND

With the continuous development of science and technology, electronic devices are continuously developed towards intelligence. In addition to digital cameras, portable electronic devices such as tablet computers and mobile phones are also equipped with lens modules having photographing and image shooting functions, so as to meet the photographing needs of users at any time. The lens module of the related art includes a lens barrel, a lens accommodated in the lens barrel, and a pressing ring abutted against the lens from an image side to fix the lens, and an outer diameter of the pressing ring is matched with an inner diameter of the lens barrel.

It has been founded by the inventors that the existing technologies at least have the following problems: the pressing ring has poor roundness due to burrs in the outer diameter of the pressing ring, and is easy to deflect when assembling the pressing ring, and the assembly precision of the pressing ring is not high, resulting in lower yield rate of the lens module.

BRIEF DESCRIPTION OF THE DRAWINGS

One or more embodiments are illustrated by way of example through the figures in the corresponding accompanying drawings, which are not intended to limit the embodiments, and elements having the same reference numerals in the accompanying drawings are illustrated as similar elements. Unless otherwise stated, the figures in the accompanying drawings do not constitute a limitation of ratio.

DETAILED DESCRIPTION

To make the objects, technical solutions, and advantages of the present disclosure clearer, the embodiments of the present disclosure are further described in detail hereinafter with reference to the drawings. However, those of ordinary skills in the art can understand that, in the embodiments of the present disclosure, many technical details are proposed for readers to better understand the present disclosure. However, even without these technical details and various changes and modifications based on the following embodiments, the technical solutions sought to be protected by the present disclosure can also be realized.

Figure 1:
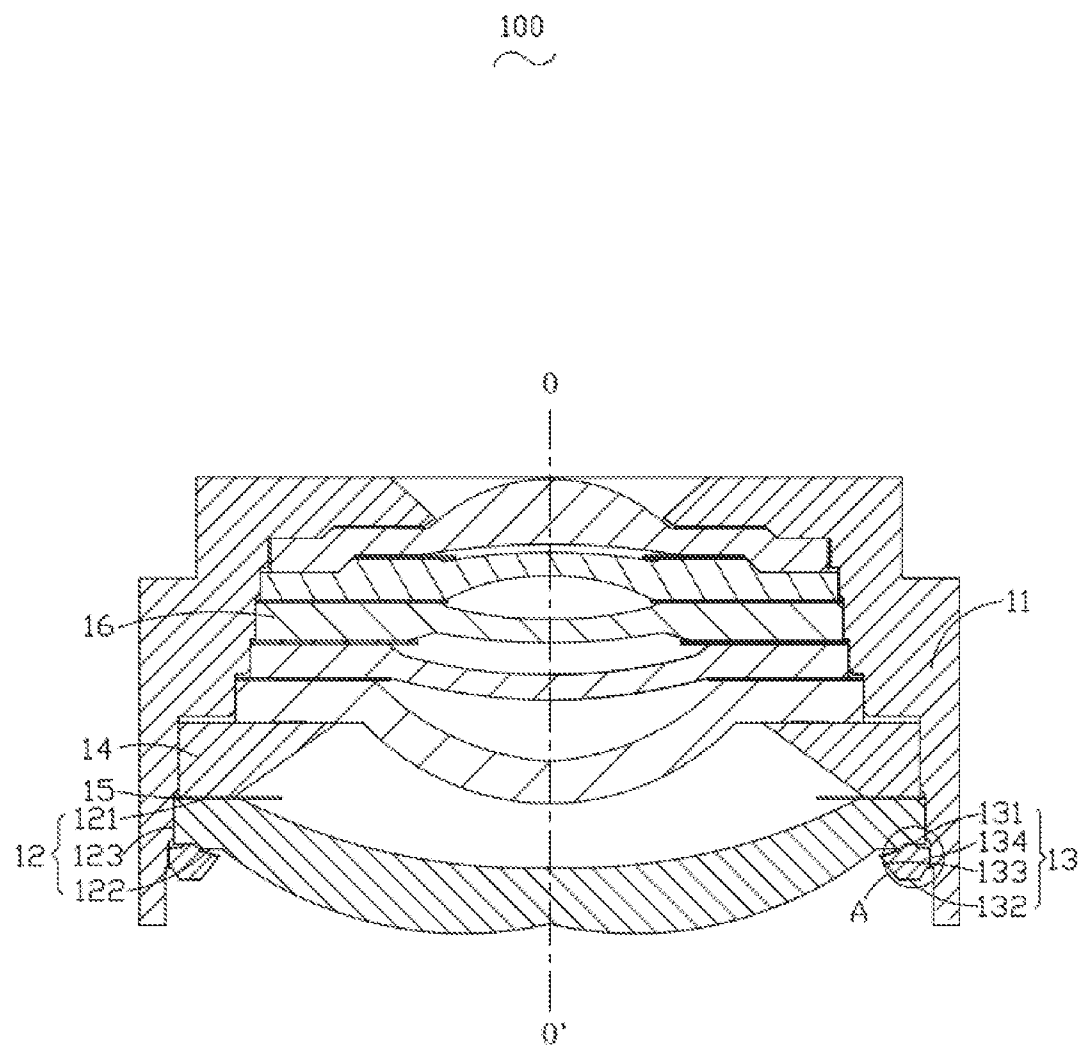
FIG. 1 is a sectional structural view of a lens module provided by a first embodiment of the present disclosure.
Figure 2:
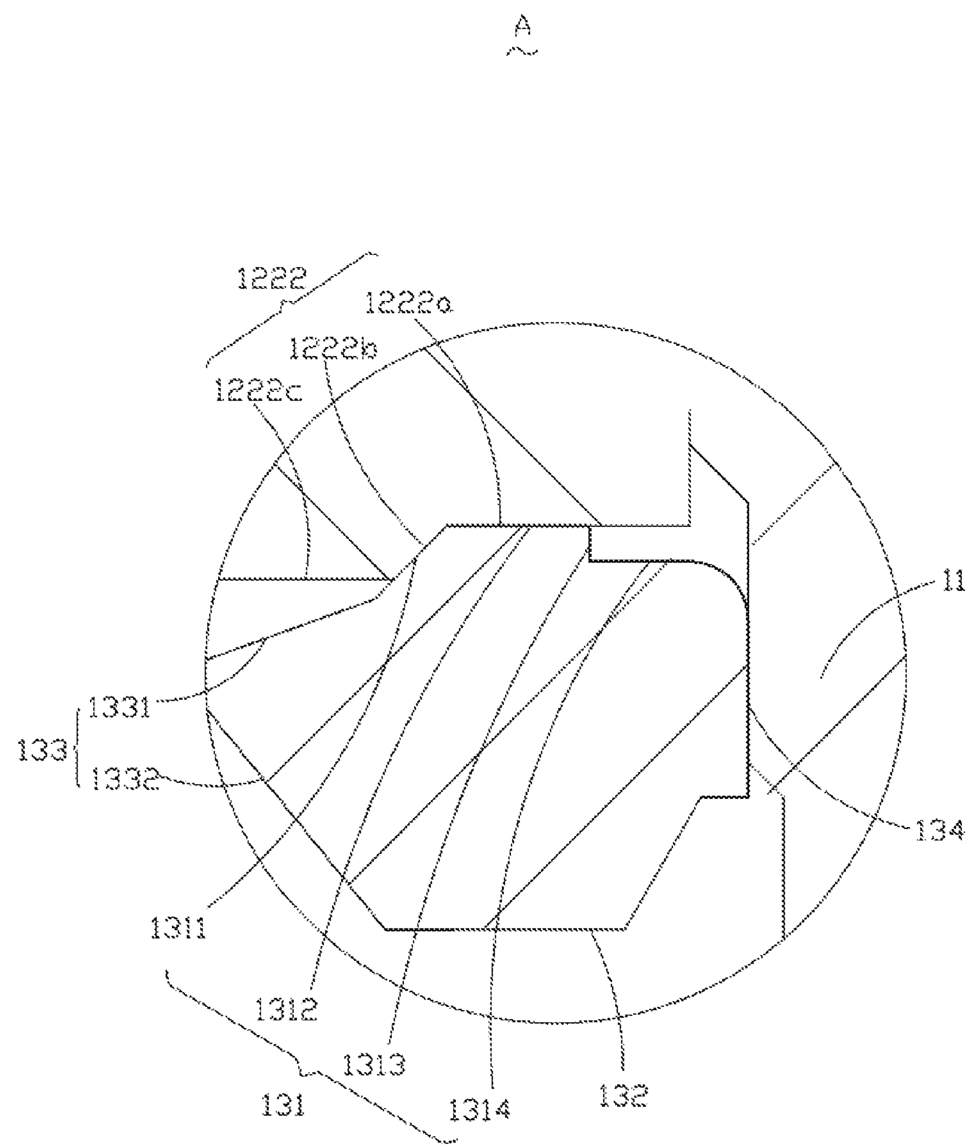
FIG. 2 is a partial enlarged view of portion A in FIG. 1.

The first embodiment of the present disclosure relates to a lens module 100, as shown in FIG. 1 to FIG. 2, including a lens barrel 11, a lens 12 having an optical axis OO' accommodated in the lens barrel 11, and a pressing ring 13 abutted against the lens 12 from an image side. The pressing ring 13 includes an upper surface 131 close to an object side, a lower surface 132 disposed opposite to the upper surface 131, an inner connecting surface 133 connecting the upper surface 131 and the lower surface 132, and an outer connecting surface 134 opposite to the inner connecting surface

133. The outer connecting surface 134 is abutted against the lens barrel 11. The upper surface 131 includes a first surface 1311 extending towards the object side from an edge of the inner connecting surface 133 close to the object side along a direction far away from the optical axis OO', and a second surface 1312 extending from an edge of the first surface 1311 far away from the inner connecting surface 133 towards the direction far away from the optical axis OO. The first surface 1311 and the second surface 1312 are abutted against the lens 12.

Comparing the embodiment of the present disclosure with the existing technologies, since the first surface 1311 is abutted against the lens 12 and the first surface 1311 extends towards the object side from the edge of the inner connecting surface 133 close to the object side along the direction far away from the optical axis OO', components vertical to the optical axis OO' and far away from the optical axis OO' exist in the acting force of the lens 12 on the pressing ring 13, so that the pressing ring 13 does not need to be matched with the lens barrel 11 through the outer diameter, thus avoiding the problem that the pressing ring 13 is easy to deflect when assembling the pressing ring 13 due to burrs in the outer diameter of the pressing ring 1, ensuring the assembly precision of the pressing ring 13, and improving the yield rate of the lens module 100.

In the embodiment, the pressing ring 13 is made of plastics. The lens 12 made by plastics (hereinafter referred as plastics lens 12) is light in weight, easy to process and convenient to transport; is not easy to break, has less broken fragments, is not sharp, and has higher safety. The plastic lens 12 has strong antifogging property, thus improving the imaging quality of the lens module 100. The plastic lens 12 can prevent dents. Generally, high-heat and small-volume substances are easy to cause dents and spots on a glass sheet. However, when touching the plastic lens 12, the plastic lens 12 will automatically bounce off without causing any marks on the surface of the lens 12, thus prolonging the service life of the lens module 100.

Specifically, the lens 12 includes an optical portion 121 and a bearing portion 122 disposed around the optical portion 121, the bearing portion 122 includes an object-side surface 1221 close to the object side, an image-side surface 1222 disposed opposite to the object-side surface 1221, and a peripheral surface 1223 connecting the object-side surface 1221 and the image-side surface 1222. The image-side surface 1222 includes a third surface **1222*a* extending from an edge of the peripheral surface 1223 towards a direction close to the optical axis OO', a fourth surface 1222*b* extending from an edge of the third surface 1222*a* far away from the peripheral surface 1223 towards the image side along the direction close to the optical axis OO', and a fifth surface 1222*c* extending from an edge of the fourth surface 1222*b* far away from the third surface 1222*a* towards the direction close to the optical axis OO. The second surface 1312 is abutted against the third surface 1222*a*, and the first surface 1311 is abutted against the fourth surface 1222*b***.

Optionally, the second surface 1312 and the third surface **1222*a*** are vertical to the optical axis OO'.

It is worth mentioning that the upper surface 131 further includes a sixth surface 1313 extending from an edge of the second surface 1312 far away from the first surface 1311 towards the image side, and a seventh surface 1314 extending from an edge of the sixth surface 1313 far away from the second surface 1312 towards a direction far away from the optical axis OO'. The seventh surface 1314 and the first surface 1311 are spaced apart from each other. The seventh surface 1314 is spaced apart from the lens 12, and the seventh surface 1314 is smoothly connected in transition with the outer connecting surface 134.

In the embodiment, the lens module 100 further includes a shielding plate 14 disposed at the object side of the lens 12. Such arrangement can reduce false light entering the lens barrel 11, thus improving the imaging quality of the lens barrel 11. Optionally, a shade 15 is disposed between the lens 12 and the shielding plate 14, thereby further emitting false light and improving the imaging quality of the lens module 100.

In the embodiment, the lens module 100 further includes a lens group 16 disposed at an object side of the shielding plate 14. The lens group 16 includes at least five lenses stacked from the object side towards the image side, and the lens group 16 is abutted against the lens barrel 11 from the image side.

Specifically, the inner connecting surface 133 includes a first inclined surface 1331 extending towards the image side from the first surface 1311 along the direction close to the optical axis OO', and a second inclined surface 1332 connecting the first inclined surface 1331 and the lower surface 132, and the second inclined surface 1332 extends from the first inclined surface 1331 towards the direction far away from the optical axis OO'.

Those of ordinary skills in the art can understand that the above embodiments are specific embodiments for implementing the present disclosure, and in practical applications, various changes in form and detail can be made to the embodiments without departing from the scope of the present disclosure.

What is claimed is:

1. A lens module, comprising:

a lens barrel, a lens having an optical axis accommodated in the lens barrel, and a pressing ring abutted against the lens from an image side, wherein the pressing ring comprises an upper surface close to an object side, a lower surface disposed opposite to the upper surface, an inner connecting surface connecting the upper surface and the lower surface, and an outer connecting surface opposite to the inner connecting surface;

the outer connecting surface is abutted against the lens barrel;

the upper surface comprises a first surface obliquely extending towards the object side from an edge of the inner connecting surface close to the object side along a direction far away from the optical axis, and a second surface extending from an edge of the first surface far away from the inner connecting surface towards the direction far away from the optical axis; and the first surface and the second surface are abutted against the lens; wherein the lens comprises an optical portion and a bearing portion disposed around the optical portion, the bearing portion comprises an object-side surface close to the object side, an image-side surface disposed opposite to the object-side surface, and a peripheral surface connecting the object-side surface and the image-side surface;

the image-side surface comprises a third surface extending from an edge of the peripheral surface towards a direction close to the optical axis, a fourth surface obliquely extending from an edge of the third surface far away from the peripheral surface towards the image side along the direction close to the optical axis, and a fifth surface extending from an edge of the fourth surface far away from the third surface towards the direction close to the optical axis; the fifth surface and the inner connecting surface are arranged at intervals in the direction of the optical axis;

the second surface is abutted against the third surface, and the first surface is abutted against the fourth surface; the second surface, the third surface and the fifth surface are vertical to the optical axis.

2. The lens module according to claim 1, wherein the upper surface further comprises a sixth surface extending from an edge of the second surface far away from the first surface towards the image side, and a seventh surface extending from an edge of the sixth surface far away from the second surface towards a direction far away from the optical axis;

the seventh surface and the first surface are spaced apart from each other, the seventh surface is spaced apart from the lens, and the seventh surface is smoothly connected in transition with the outer connecting surface.

3. The lens module according to claim 1, wherein the pressing ring is made of plastics.

4. The lens module according to claim 1, further comprising a shielding plate disposed at the object side of the lens.

5. The lens module according to claim 4, wherein a shade is disposed between the lens and the shielding plate.

6. The lens module according to claim 4, further comprising a lens group disposed at an object side of the shielding plate, wherein the lens group comprises at least five lenses stacked from the object side towards the image side, and the lens group is abutted against the lens barrel from the image side.

7. The lens module according to claim 1, wherein the inner connecting surface comprises a first inclined surface extending towards the image side from the first surface along the direction close to the optical axis, and a second inclined surface connecting the first inclined surface and the lower surface;

the second inclined surface extends from the first inclined surface towards the direction far away from the optical axis.

* * * * *